United States Patent

[11] 3,609,374

[72] Inventor Philip Gevas
Roseland, N.J.
[21] Appl. No. 619,889
[22] Filed Feb. 24, 1967
[45] Patented Sept. 28, 1971
[73] Assignee Singer-General Precision, Inc.
Little Falls, N.J.

[54] WEIGHTED SCAN STAR SCANNER
7 Claims, 22 Drawing Figs.

[52] U.S. Cl. 250/203 R, 250/235
[51] Int. Cl. G01s 5/16
[50] Field of Search 250/203, 235

[56] References Cited
UNITED STATES PATENTS
3,206,606 9/1965 Burgo et al. 250/235 X

*Primary Examiner*—Rodney D. Bennett, Jr.
*Assistant Examiner*—Daniel C. Kaufman
*Attorneys*—S. A. Giarratana and G. B. Oujevolk

ABSTRACT: Possible incident star energy is directed onto a deflecting mirror as a beam which will systematically reflect said beam upon one of a plurality of detector elements arranged in a linear array, generating a signal. This signal is amplified and fed to a level detector. When a predetermined threshold is exceeded, the output of the level detector activates a trigger. The trigger activates a flip-flop which causes the scanner to reverse and rescan the limited area where the possible stars occurred. This time, the signal is passed through another channel wherein the time constant for the filter is increased by about three, (the number of rescans). This results in an improvement in the signal to noise ratio of about $\sqrt{3}$ at the point in question. The level detector trigger associated with the second channel is set at a higher threshold. When this trigger is activated, the acquisition problem is solved and the probability of star presence is over 0.99. This second channel trigger enables a second flip-flop switching the scanner to the fine mode, whose purpose is merely of more accurately defining the position of the star in the search field. In the fine mode, when the signal from the star is centered, an output at one frequency may be provided whereas an increasingly large off-axis error signal in another frequency may be provided for off-center both in azimuth and elevator. These error signals act on the scanner so as to move the scanner in line with the star scanned.

PHILIP GEVAS
INVENTOR.
BY S. A. Giarratana
George B. Oujevolk
ATTORNEYS

PHILIP GEVAS
INVENTOR.
BY S. A. Giarratana
George B. Oujevolk
ATTORNEYS

PHILIP GEVAS
INVENTOR.
BY S. A. Giarratana
George B. Oujevolk
ATTORNEYS

PHILIP GEVAS
INVENTOR.
BY S. A. Giarratana
George B. Oujevolk
ATTORNEYS

PHILIP GEVAS
INVENTOR.
BY S. A. Giarratana
George B. Oujevolk
ATTORNEYS

PHILIP GEVAS
INVENTOR.
BY S. A. Giarratana
George B. Oujevolk
ATTORNEYS

PHILIP GEVAS
*INVENTOR.*

BY S.A. Giarratana
George B. Oujevolk
ATTORNEYS

PHILIP GEVAS
INVENTOR.
BY S. A. Giarratana
George B. Oujevolk
ATTORNEYS

PHILIP GEVAS
INVENTOR.
BY S. A. Giarratana
George B. Oujevolk
ATTORNEYS

PHILIP GEVAS
INVENTOR.
BY S. A. Giarratana
George B. Oujevolk
ATTORNEYS

PHILIP GEVAS
INVENTOR.
BY S. A. Giarratana
George B. Oujevolk
ATTORNEYS

PHILIP GEVAS
INVENTOR.
BY S. A. Giarratana
George B. Oujevolk
ATTORNEYS

PHILIP GEVAS
*INVENTOR.*
BY S.A. Giarratana
George B. Oujevolk
ATTORNEYS

PHILIP GEVAS
*INVENTOR.*

BY S. A. Giarratana
George B. Oujevolk
ATTORNEYS

WEIGHTED SCAN STAR SCANNER

The present invention relates to star tracking and more particularly to an arrangement for detecting and scanning or tracking stars or planets against a high noise background.

The design parameters which figure prominently in star scanners and trackers are (1) the field of view, (2) the search time, (3) the star magnitude capability, (4 ) the background brightness capability, (5) accuracy and (6) probability of acquisition.

In a conventional star tracker, a field of view of 15×30 arc seconds (¼×½) degrees) is typical.

As for search time, this should be as short as possible and preferably less than 5 seconds for the typical search field. The brief search time is necessary, particularly in scanner systems used in missiles. In this application, the star scanner is utilized to provide reference and correction data for gyros.

As for star magnitude and background brightness capabilities, it is required that star scanners be capable of detecting stars of at least 2.5 magnitude, i.e., of the polaris type, against sky backgrounds which may vary from !10 foot-lamberts to 200 foot-lamberst (a bright sky) to more than 1,000 foot-lamberts (a very bright sky and, perhaps, in the vicinity of the sun).

Accuracy is at present limited to about 5 arc seconds by the limitations of the mechanical aspects of the scanning system. Because of these limitations, the optics portions of the system are not crucial.

The final parameter, probability of acquisition, must be in the order of 0.997. Ordinarily, there is no problem of the scanners being capable of detecting the star, but there is a real problem of insuring that the scanner does not respond to spurious signals. In other words, the acquisition problem has two aspects: detection and rejection of noise, and it is the latter aspect which presents the difficulties sought to be overcome by the Gevas disclosures.

A primary consideration in approaching the problem of noise rejection is the establishment of a threshold value for the signal to noise ratio. If the threshold value is too low, the scanner will respond to spurious signals, whereas if the threshold is too high, it increases the risk of failure to detect a star. This problem is aggravated by the fact that the background noise level is not uniform across the field of view, but rather exhibits a random fluctuation of considerable amplitude. Considering the nature of the noise signals, it will be appreciated that, since a star signal would be constant, one approach to improvement in acquisition would be to reduce the scanning speed so that noise signals would, in effect, be filtered out. However, as pointed out above, scanning speed must be held to a minimum; consequently, this does not represent an acceptable solution. Insofar as the problem of acquisition is concerned, another solution to the problem which has been utilized in the prior art is repetitive scanning, employing conventional correlation/filtering techniques. The present disclosures provide a system performance which is markedly superior to these correlation techniques.

In the weighted scan system herein described, detectors arranged in a linear array perpendicular to the scanning path sample the field of view (either mechanically or electrically) until a star signal (presumed) is detected, whereupon the array or its image retrogresses a short distance and rescans only a very small segment of the field of view several times. (This is in marked contrast to conventional correlation techniques which rescan the entire field of view, whereas only a very small segment is actually in question.) If the signal actually is a star signal, it will be detected at the conclusion of the rescanning, if not, the search continues until the star is acquired. Using this scanning technique, the signal to noise threshold is set comparatively low, for example, at one-half the signal to noise ratio ordinarily used, (thereby greatly increasing the background brightness capability) and the system is arranged to both raise the threshold to a relatively high signal to noise ratio and to change the matched-filter-bandwidth, when the scanner retraces to make its subsequent passes. (Again, this is in marked contrast to conventional correlation techniques, which do not employ variable bandwidths in the same acquisition problem.)

The invention as well as other objects and advantages thereof will be better understood from the following detailed description table together with the accompanying drawing, in which:

FIG. 1*a* is an elementary representation of part of the present concept;

FIG. 1*b* is a representation of the scan pattern;

Figure 9:
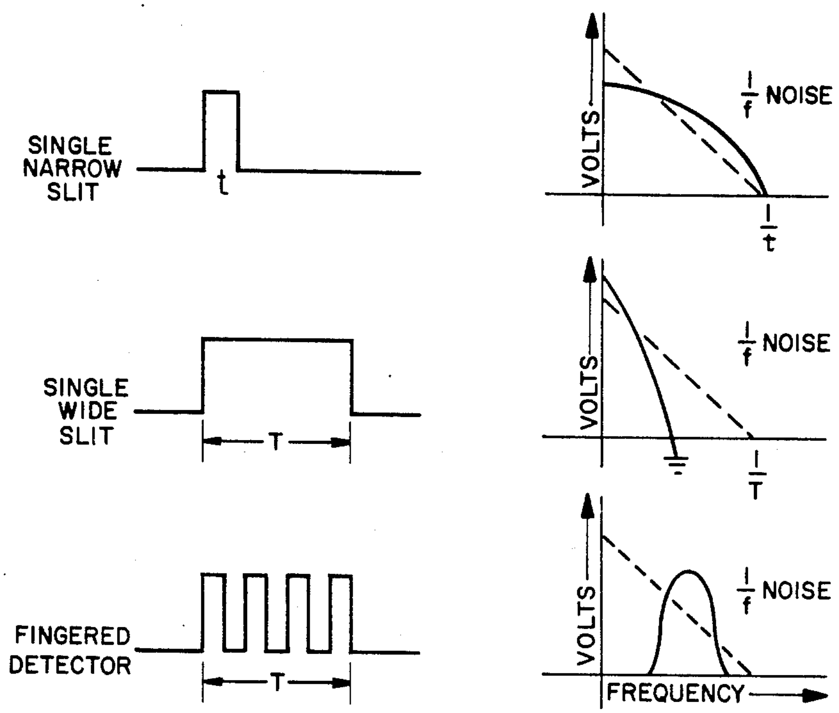
Figure 10:
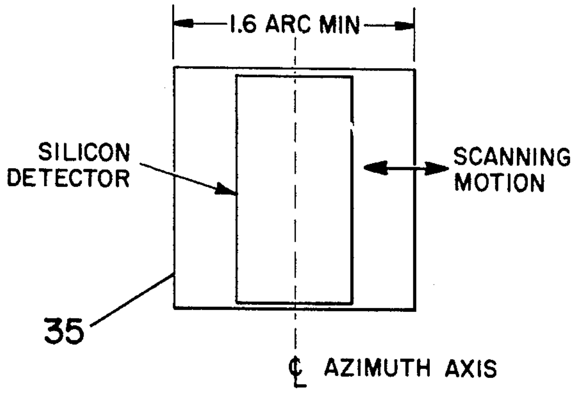
Figure 11:
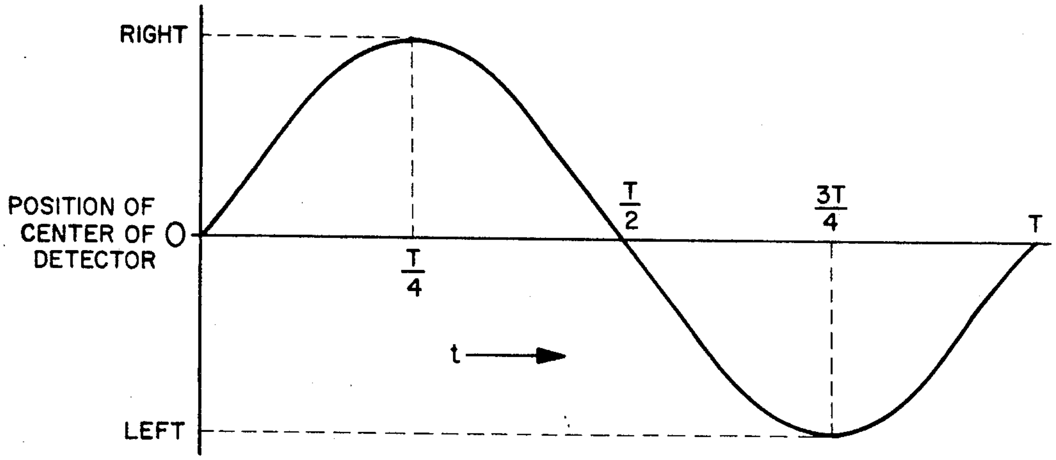
Figure 12:
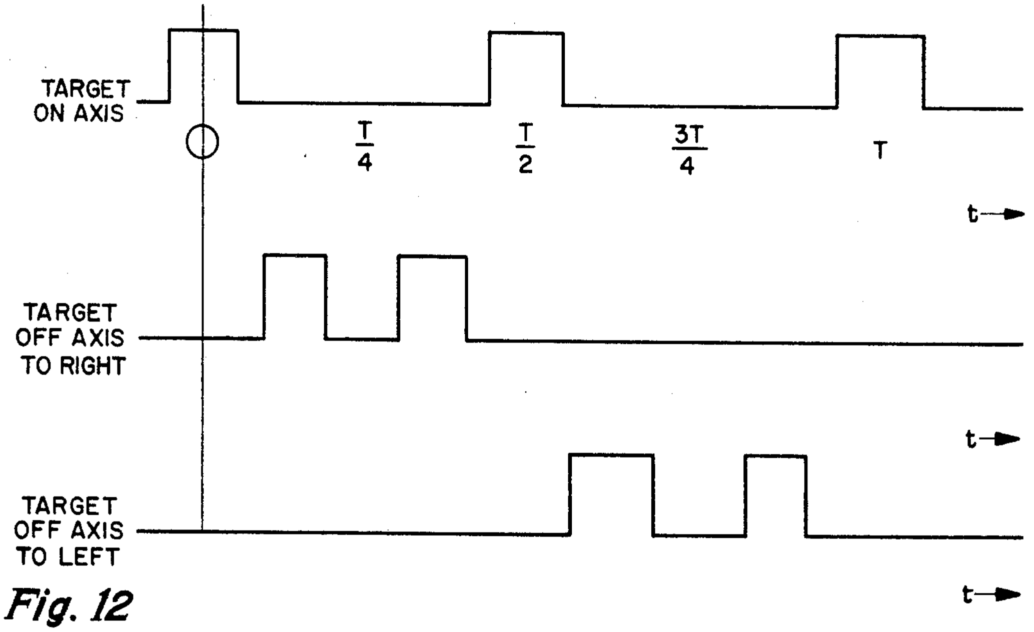
Figure 13:
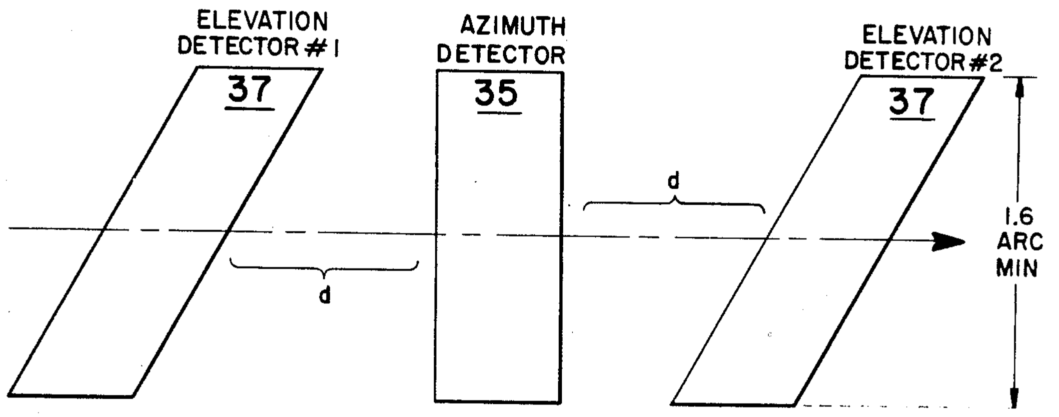
Figure 14:
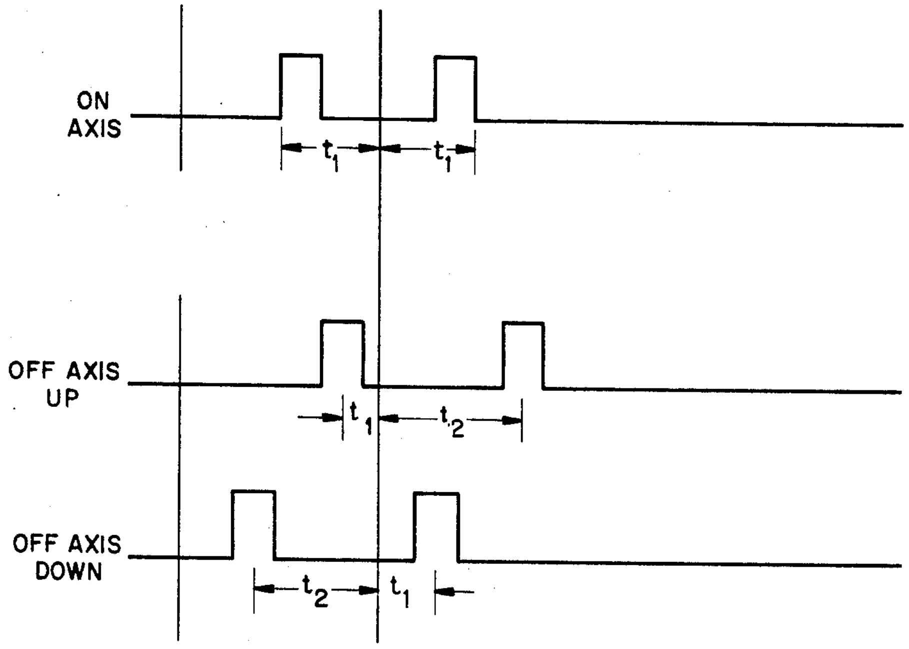
Figure 15:
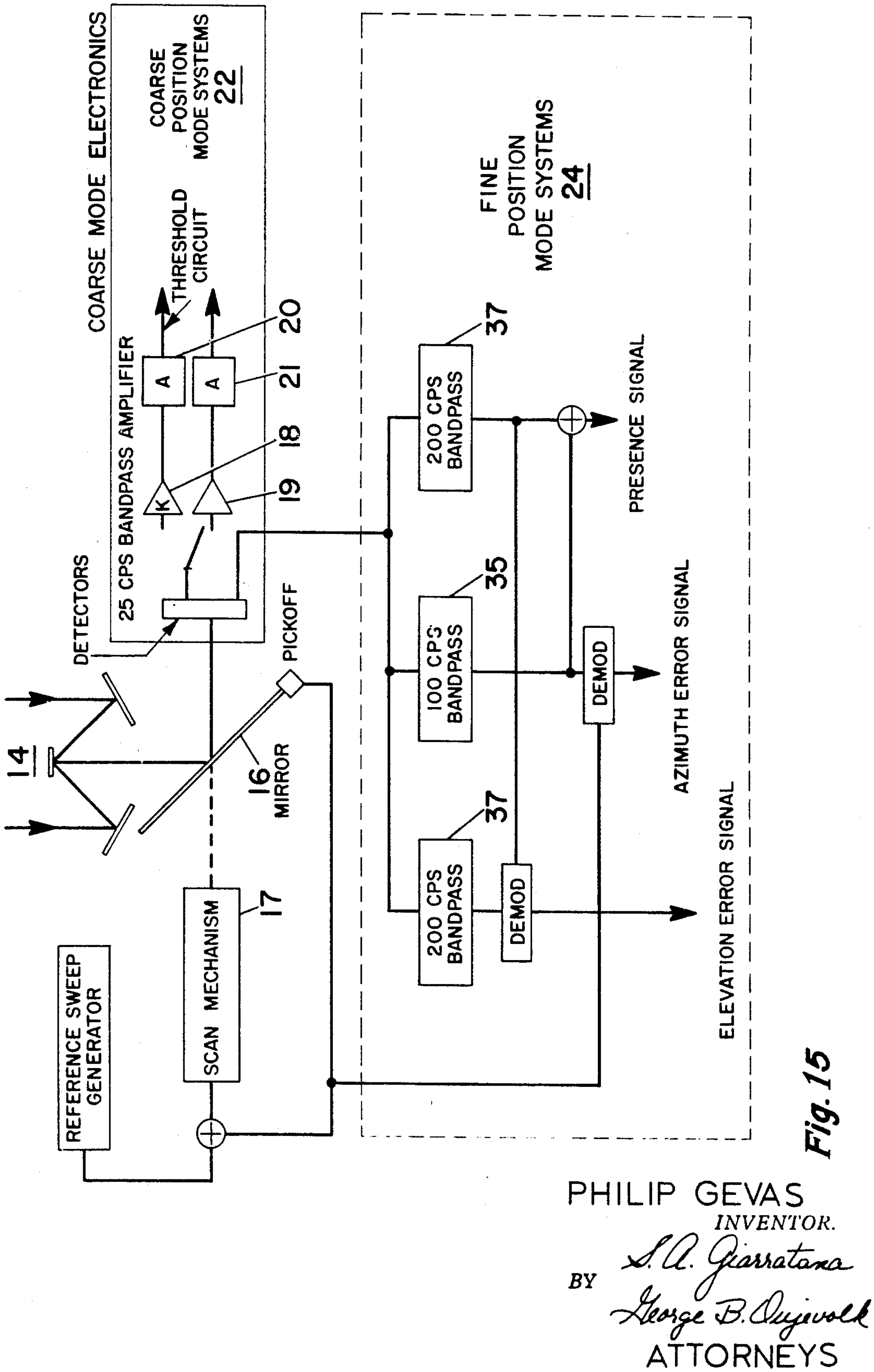
Figure 16:
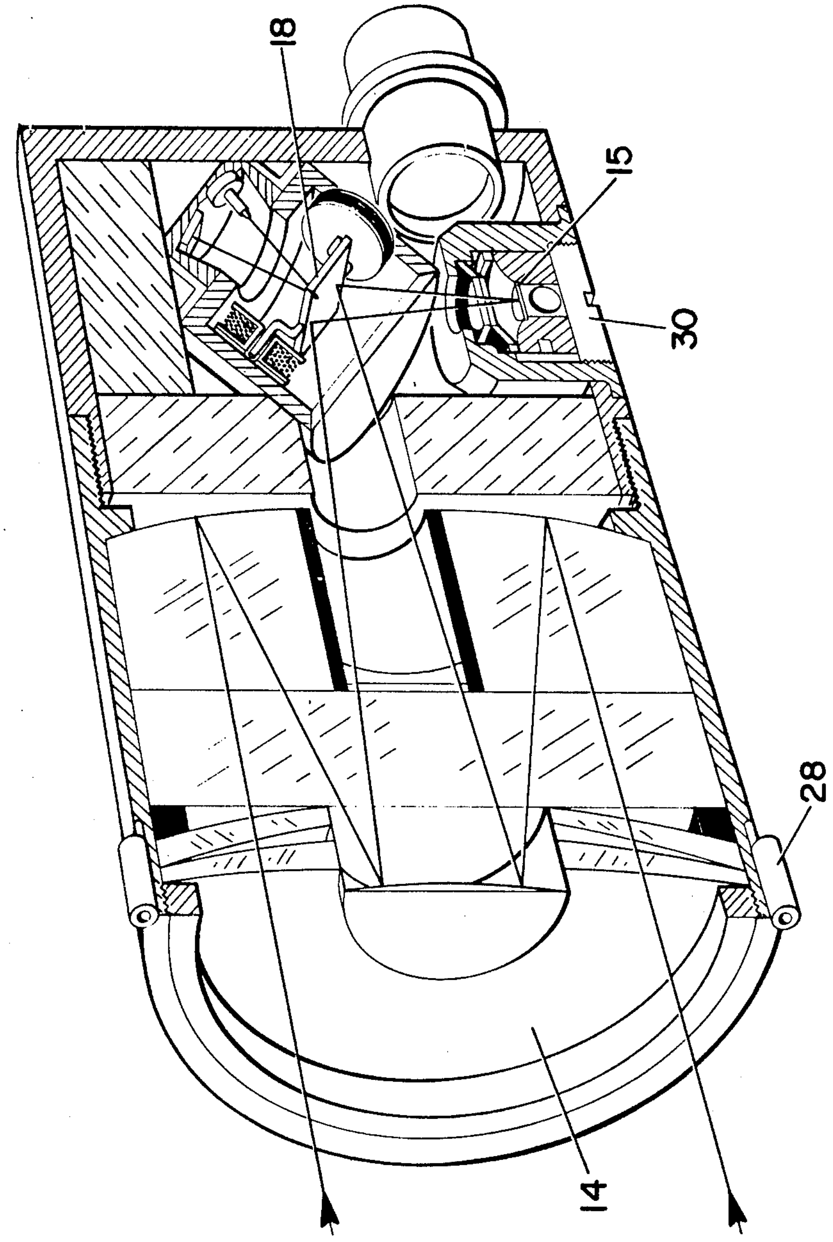
Figure 17:
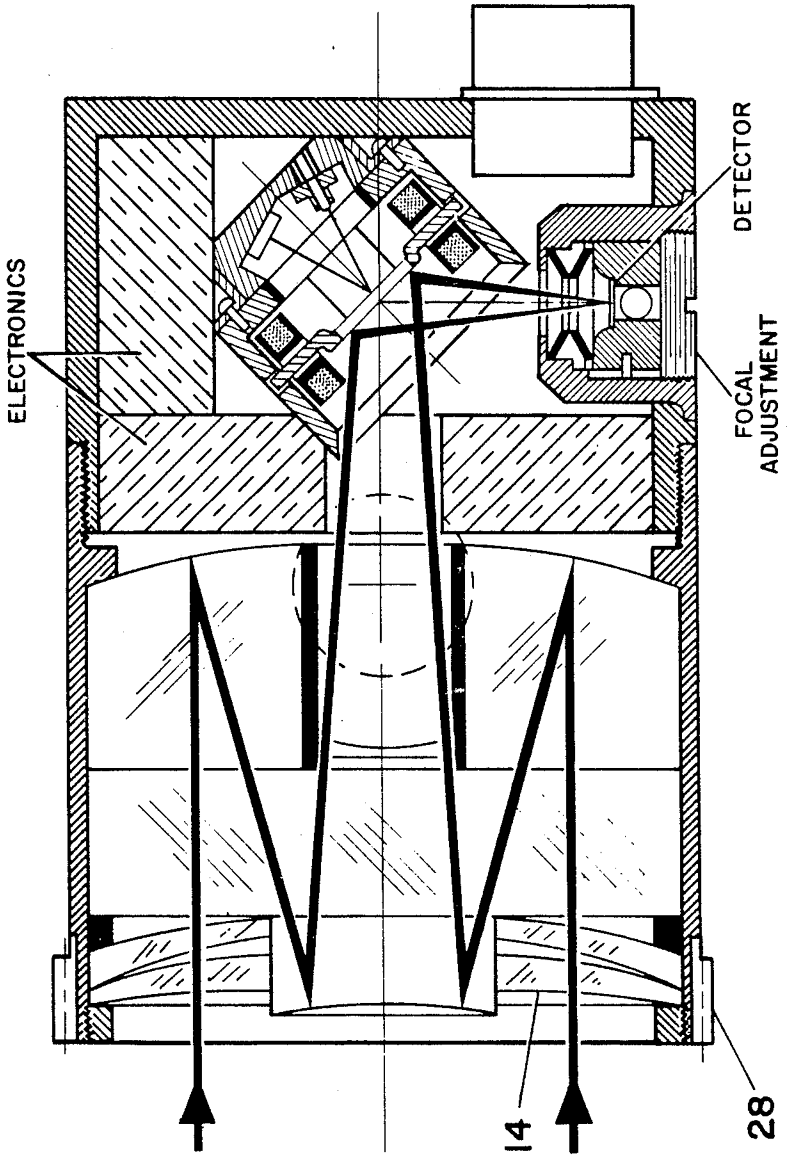
Figure 18:
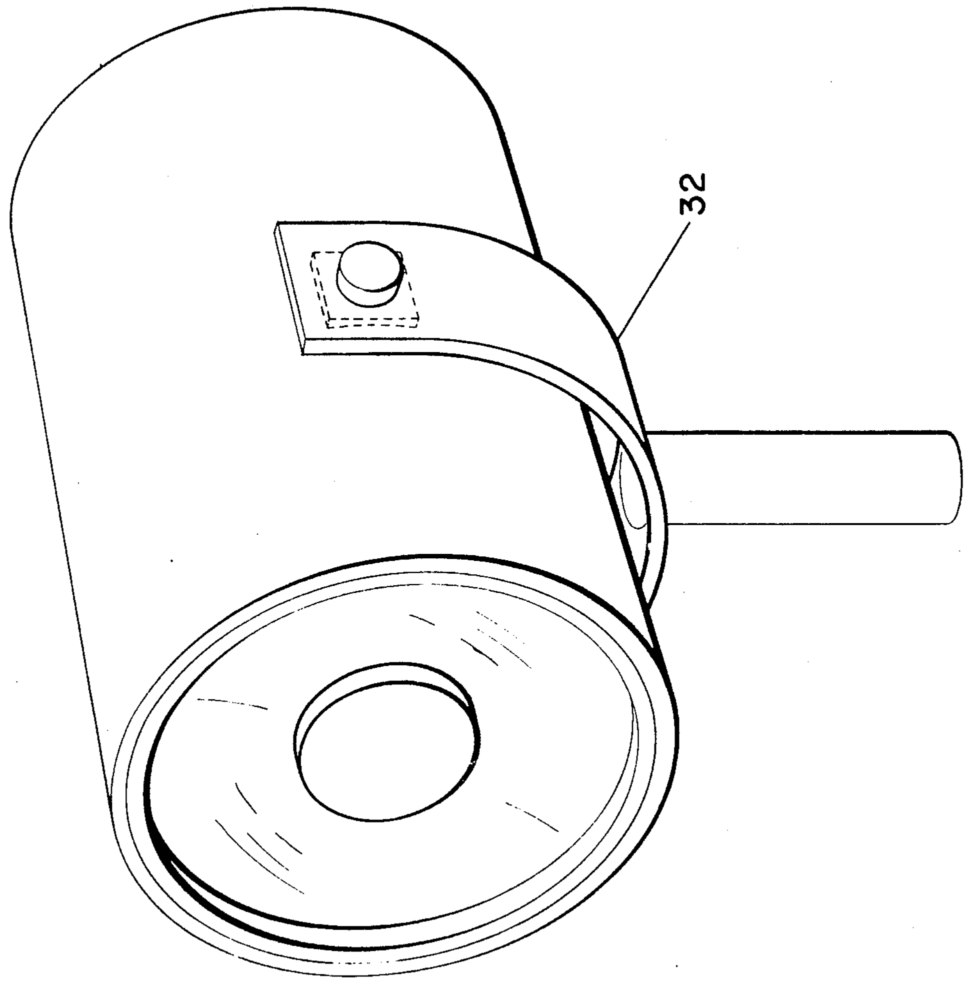
Figure 19:
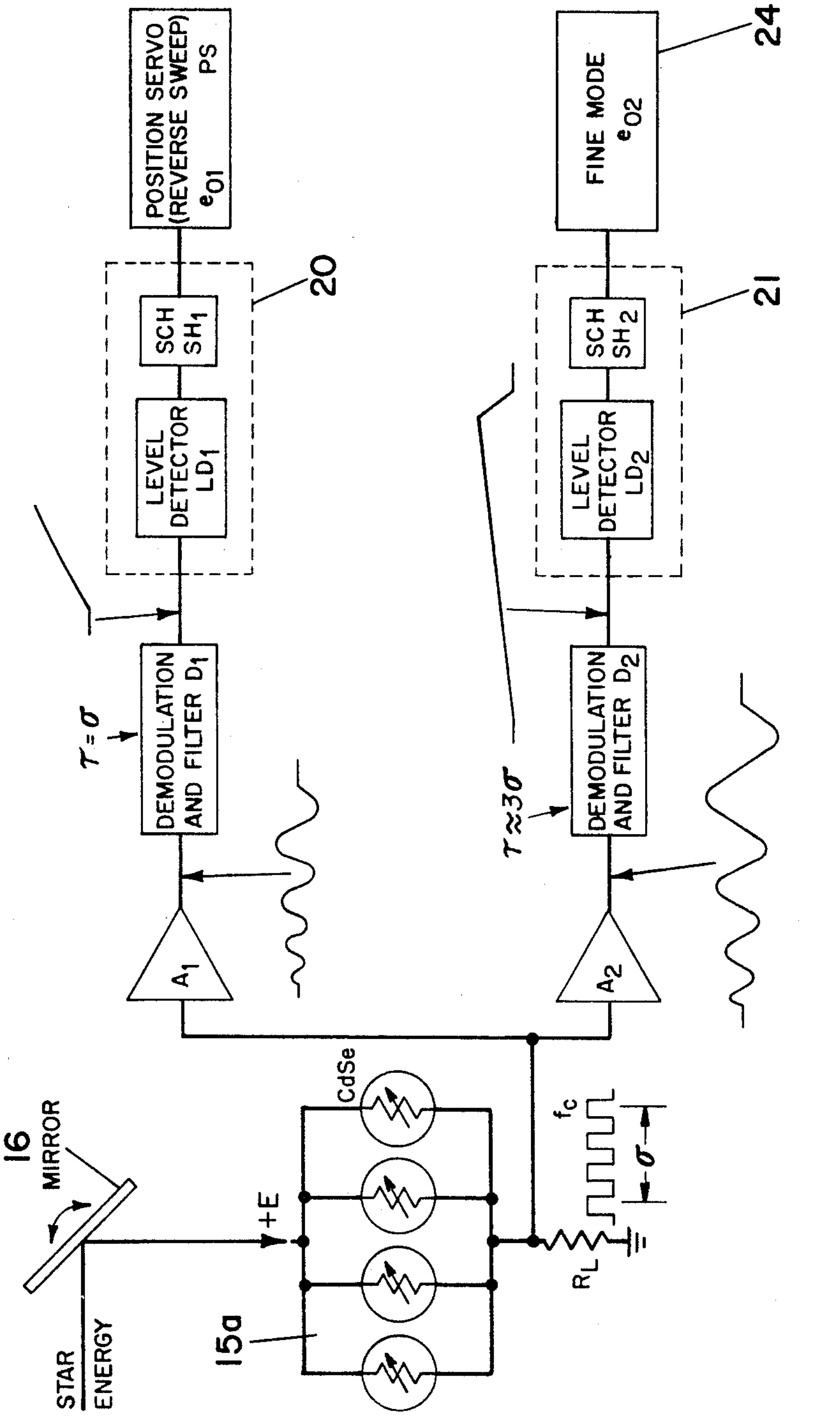
Figure 20:
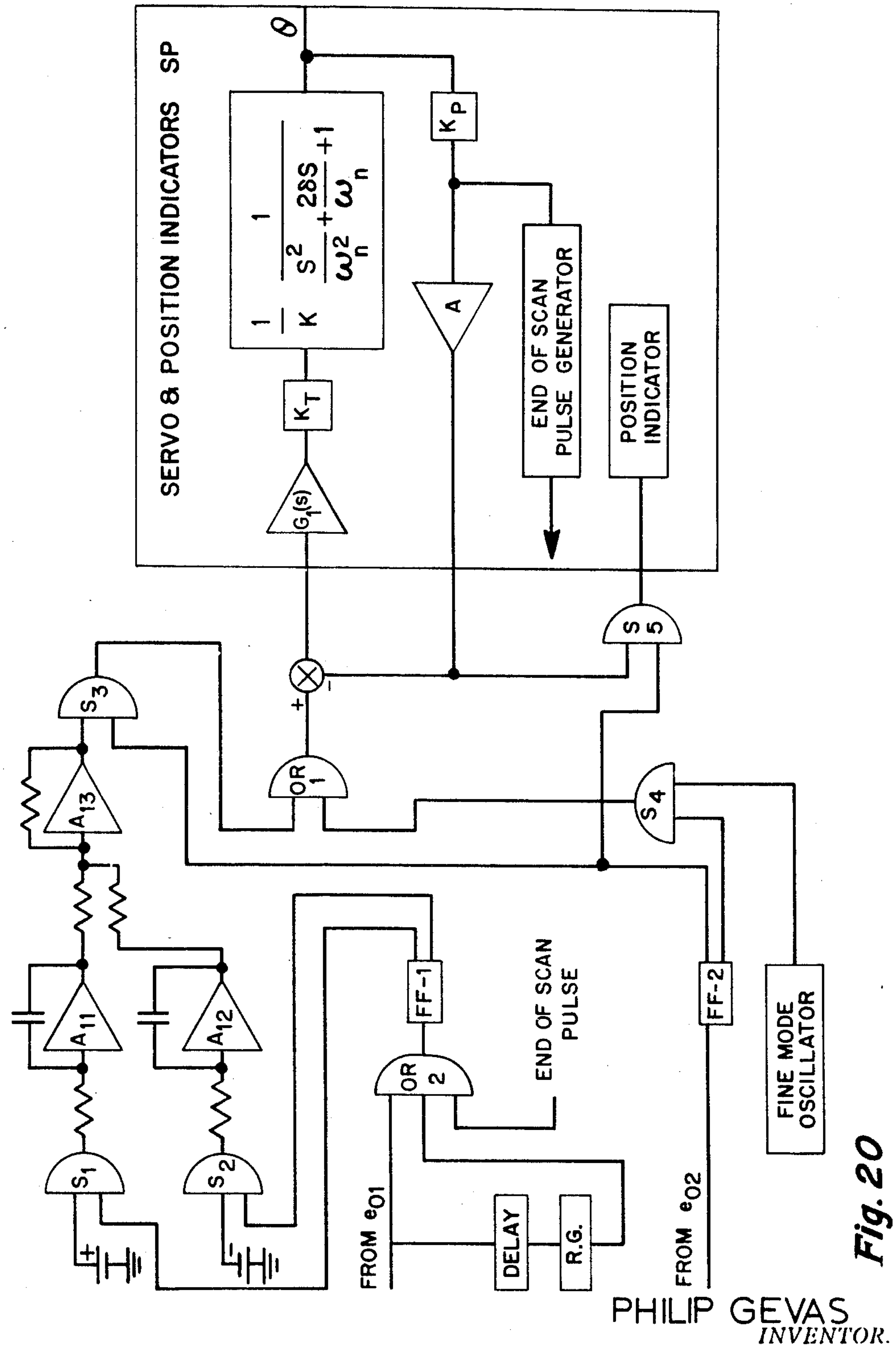
Figure 21:
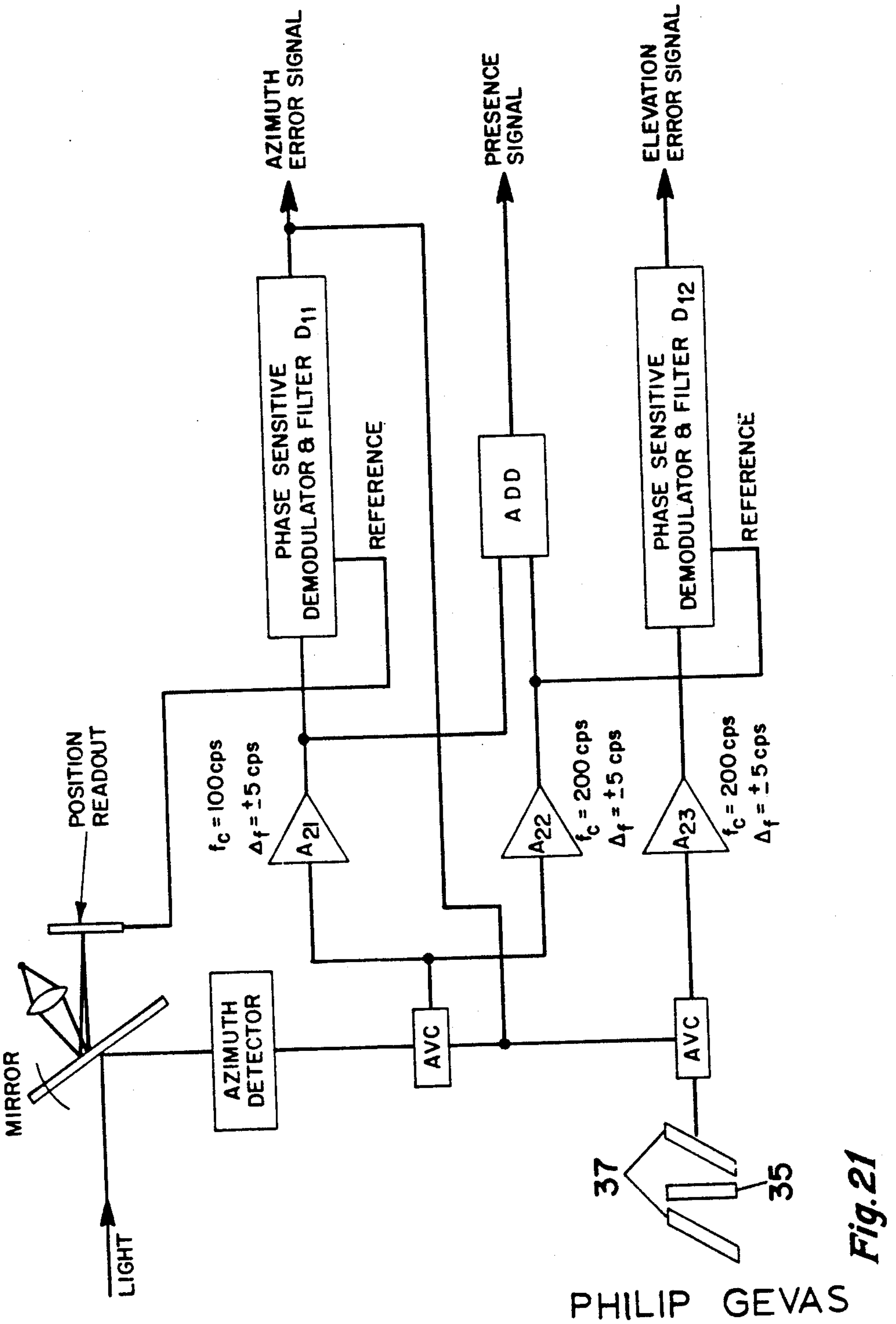

FIG. 9 graphically illustrates possible signals used herein;

FIG. 10 schematically depicts an azimuth detector;

FIG. 11 is a graphic representation of the scan motion;

FIG. 12 shows the pulse signals received from the azimuth detector;

FIG. 13 is a diagram of an elevation detector used herein;

FIG. 14 provides the type of pulse signals obtained from elevation detector of FIG. 13;

FIG. 15 is a block diagram of the system herein contemplated;

FIG. 16 is a perspective cut view of the star scanner herein contemplated;

FIG. 17 is a longitudinal cross-sectional view of the scanner of FIG. 16;

FIG. 18 is a perspection view of the scanner of FIG. 16 when mounted;

FIG. 19 is a block and schematic diagram of the coarse detection mode;

FIG. 20 is a block and schematic diagram of the scanner's logic and electronic circuits; and, FIG. 21 is a block diagram of the fine detection mode circuits.

Generally speaking, using conventional correlation techniques, repeated scanning of the field M times at T/M seconds per scan is equivalent to scanning once in T seconds (for the shot noise-limited case). That is, if false alarms occur during some scans, they are eliminated by correlating over M scans, but at an equivalent expense in time.

However, the false alarms (noise pulses) occur only a relatively few times. Therefore, correlating at essentially every point (repeated scans) penalizes any system severely, timewise. If, instead, the system samples repeatedly only where false alarms occur, an improvement in signal to noise of the square root of the number of samples can be realized at the points on question. Therefore, the system can operate at a lower signal to noise ratio. This, in turn, results in either increased background capability and/or a reduction in the number of detectors.

The present invention contemplates, in the preferred embodiment, directing possible incident star energy onto a deflecting mirror as a beam which will systematically reflect said beam upon one of a plurality of detector elements arranged in a linear array, generating a signal. This signal is amplified and fed to a level detector. When a predetermined threshold is exceeded, the output of the level detector activates a trigger. The trigger activates a flip-flop which causes the scanner to reverse and rescan the limited area where the possible stars occurred. This time, the signal is passed through another channel wherein the time constant for the filter is increased by about three, (the number of rescans). This results in an improvement in the signal to noise ratio of about $\sqrt{3}$ at the point in question. The level detector trigger associated with the second channel is set at a higher threshold. When this trigger is activated, the acquisition problem is solved and the probability of star presence is over 0.99. This second channel trigger enables a second flip-flop switching the scanner to the fine mode, whose purpose is merely of more accurately defining the position of the star in the search field. In the fine mode, when the signal from the star is centered, an output at one frequency may be provided whereas an increasingly large off-axis error signal in another frequency may be provided for off-center both in azimuth and elevator. These error signals act on the scanner so as to move the scanner in line with the star scanned.

It is shown in the literature that repeated scanning of a search field M times at T/M seconds per scan (with bounds on T, if necessary) and correlating is not better than scanning the field once in T seconds with a matched filter. Therefore, the choice depends on the instrumentation available. In a search system, to achieve a high probability of acquisition (say, 0.997), a minimum signal to noise ratio of approximately 8 is required. This requires a false alarm rate ($f$) in the order of $10^{-6}$.

A heavy price is paid timewise in all search systems, since although false alarms have a low probability of occuring, equal time is spent at each portion of the search field.

However, if we increase the observation time by some factor ($m$) only at questionable points in the scan, the signal to noise ratio increases by the factor $\sqrt{1+m}$ at these points. Thus, we can "weight" out our time spatially ("weighted-scan") and realize a net gain by operating at a much higher false alarm rate ($f$=0.10) and lower signal to noise ratio (approximately half). This greatly increases the background brightness capability of the star tracker, which is the most important figure of merit for such systems.

In the implementation of the 11 scan concept. consider a circular reticle deflected in some manner (raster or spiral scan, etc.) at constant speed with a dwell time, T. If the threshold (bandwidth proportional to 1/T is exceeded, the reticle reverses over the resolution element (arc-wise if spiral scan) in question m times and a decision is made relative to a second threshold (bandwidth proportional to 1/1+$m$) T). If the second threshold is exceeded, star acquisition is complete; if it is not, the search is continued.

However, for high background capability, there is a more optimum method if implementing the weighted-scan technique. The reticle should be a linear array of multiple solid-state detectors. Elevation information will be given approximately by whichever detector in the array provides the decision signal. (This requires a fine mode to more accurately locate the star within the detector area for a reasonable number of detectors.) Azimuth information will be given approximately by the detector width.

Figure 1A:
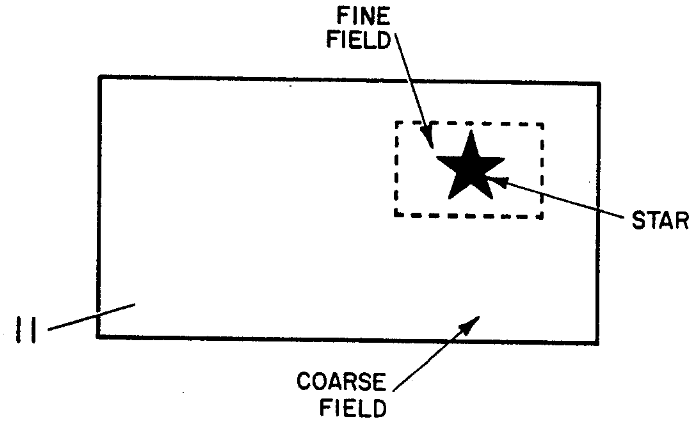
Figure 1B:
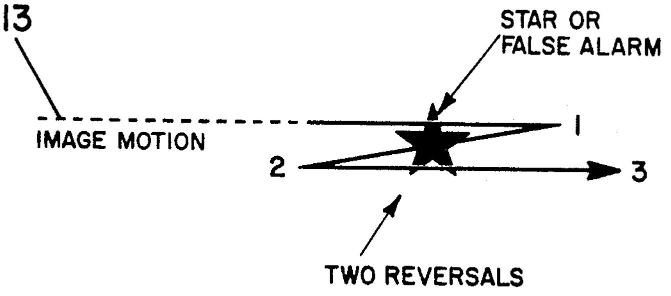

The system operation consists of: locating the telescope to a coarse field 11 (FIG. 1$a$); effectively sweeping the linear array across the field; reversing the path 13 (FIG. 1$b$ ) twice, whenever a predetermined threshold (Bandwidth proportional to 1/T is exceeded; and making a final decision at a second threshold level and second bandwidth (proportional to 1/3T).

If a star is not detected in a given coarse field, the telescope is moved in accordance with a predetermined search pattern, and the process continues. When a star is detected, the fine mode is initiated and the star is tracked.

Although there is a Poisson (or approximately Gaussian) distribution of false alarms and hence, recheck times, associated with the weighted-scan technique, the variance, timewise, is very small for typical search fields. If $n$=search field width/detector WIDTH $f$=false alarm rate It can be shown that with a probability of 0.999, the number of false alarms will be within $$nf \pm 3.3\, nf(1-f)$$

where $nf$ is the average number of false alarms. The added time per false alarm is $2T$, where $T$ is observation time. For the proposed system:

$$f=0.1 \text{ and } T=0.14 \text{ seconds}$$

For a typical search field, we take 1 by 2°.

For the proposed coarse field of 16 arc-minutes by 30 arc-minutes, $n$=288, at the basic scan rate given by T, the 1° by 2° field would be covered in 37 seconds for the case of no false alarms. From the above, since $nf$=29, the number of false alarms lies within the range of 12 to 46. With a probability of 0.999, the recheck times lie in the range of 4 to 13 seconds. Since the search time (ST) is the basic scan time of 37 seconds plus the recheck times, the average ST is 45 seconds and, with 0.999 probability:

$$41 \text{ sec} \leq ST \leq 50 \text{ sec}$$

For the 1° by 2° field (7200 arc-min²) we thus have an average search rate of 160 arc-min²/sec; with a probability of 0.999, the search rate will be within 144 arc-min²/sec and 175 arc-min²/sec It can be seen from the above that: (i) rechecks add but little time to the basic scan time, (ii) the fine mode time to null (approximately one second) is negligible compared to the total time and (iii) the search rate can be increased very easily by extending the linear array (field) in elevation at the expense of additional detectors. (Note that this is much easier than increasing the number of detectors within a given field, where space limitations and limits on detector resolution impose themselves.)

Figure 2:
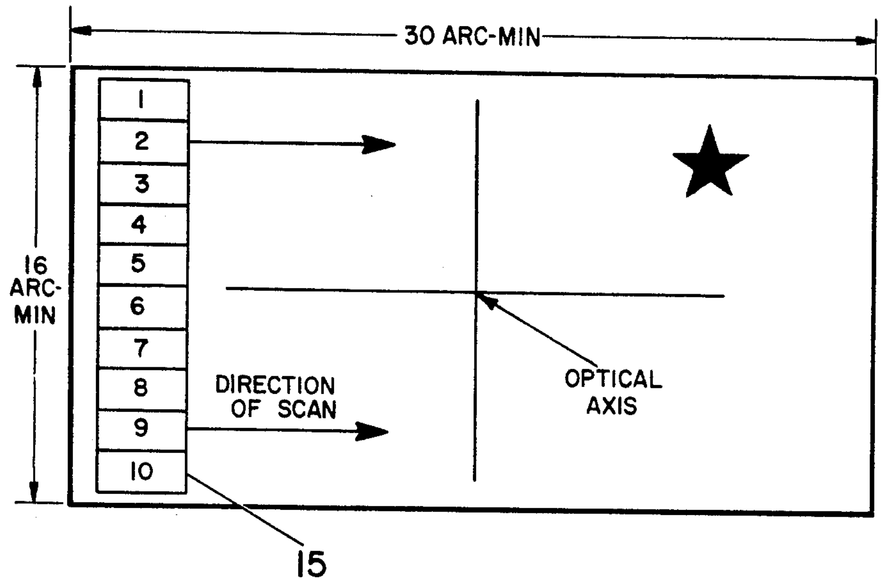
FIG. 2 is an elementary representation of the coarse acquisition mode.

The coarse field of view of the telescope is 30 arc-minutes by 16 arc-minutes. The purpose of the acquisition mode is to determine the position of the star within this field of view to within 1.6 arc-minutes in both azimuth and elevation with high probability (0.000). In order to accomplish this, 10 detectors 15 will be used, as illustrated in FIG. 2 to scan across the field of view.

As the detectors are scanning across the field, signals will be generated which are either "false alarms" or the true star signal. At each point of the scan where a signal is generated, the motion is reversed twice. Therefore, three "looks" (samples) are taken in those limited portions of the sky where a star may be located and only one look is taken at other portions of the field. This technique is herein called "weighted scan."

Figure 3:
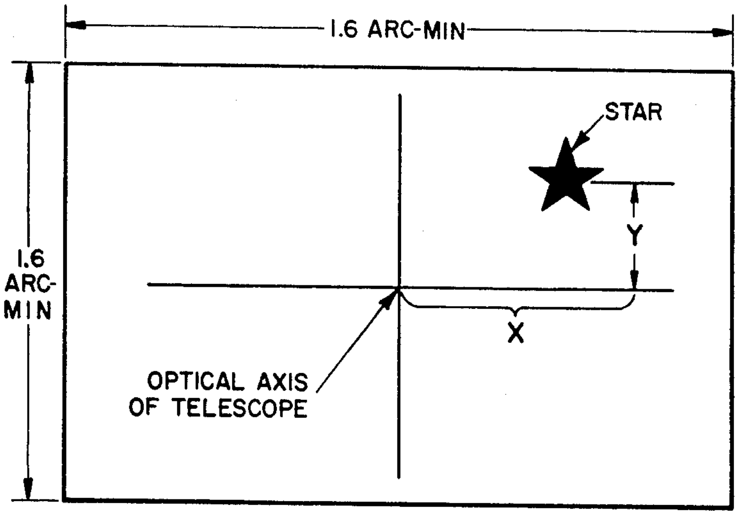
FIG. 3 is an elementary representation of the fine acquisition mode.

Using this technique, the star is acquired with a probability of success of 0.9985 By observing the detector channel in which the true star signal appears, the elevation of the star is determined to 1.6 arc-minutes. By observing the position of the detectors in the azimuthal direction when the star signal is received, the star's azimuth position is determined to 1.6 arc-minutes. The telescope is then rotated in azimuth and elevation so that the star lies within the fine field of the optical system. The system is now in the fine mode. In this mode, signals are generated, which are proportional to the star's displacement from the optical axis of the telescope. FIG. 3 illustrates this mode of operation.

There are several potential techniques that can be utilized to instrument the method of operation just described. These techniques may be discussed under the following general categories (all using the weighted scan approach):

1. Coarse/fine mode of operation
2. Methods of providing scan motion
3. Detector configuration Although it is clear that the search or acquisition (coarse) mode must utilize a scanning principle, the fine mode may be instrumented as either a scanner or a tracker. Thus, after detecting with high probability the presence of a star and determining the position of the star approximately, it is necessary to determine the star's position to a few arc-seconds. This may be accomplished either by scanning the fine field and reading out its position in this field, or alternatively by having the sensor generate error signals in azimuth and elevation and track (lock-on) to the star position.

The advantage of the scan mode is that no servo loops are required to read out the position of the star. The advantage of the tracker mode is that the scan mechanism is simplified with respect to internal scanning and more importantly, the requirements on the sensor's inertial stability can be greatly relaxed. Because of its simplicity and greater flexibility, the fine mode will be instrumented as a tracker for the present application.

The major constraints on the methods of providing the scan motion are: (i) the mechanical design should be as simple as possible, with no rubbing, moving parts, and (ii) the system should require minimum voltage and power. To meet these constraints, unidirectional drive is used for both the coarse and fine modes. This kind of motion obviates the need for an additional motor (rubbing parts) or a complex flexjoint.

The same torquers can be used that position the star sensor telescope within the platform gimbals to also provide the scanning motion of both the coarse and fine modes. Thus, the need for an additional drive mechanism could be obviated. However, this system is somewhat unattractive from the standpoint of the platform motion requirement.

Figure 4:
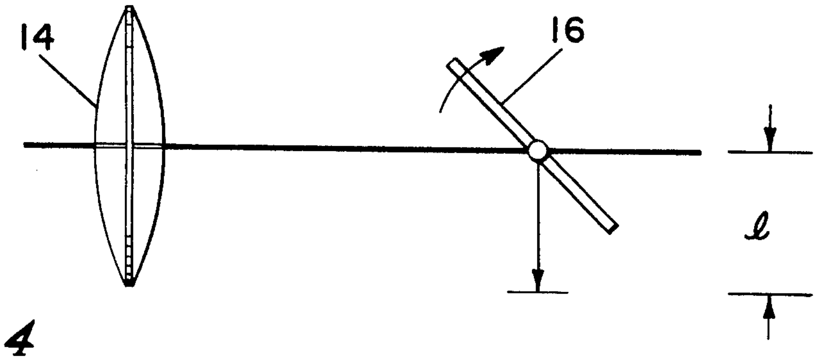
FIG. 4 depicts the primary optical system in elementary form.

Alternatively, a mirror 16 may be used to sweep the required field of view and provide the scanning motion. By keeping the detector fixed, deflecting a mirror in the path of the optical rays effectively sweeps the detector across the sky background. (see FIG. 4).

Figure 5:
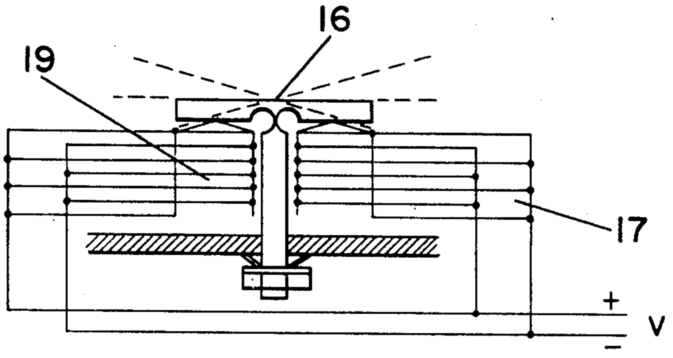
FIG. 5 is a cross-sectional view of a piezoelectric scanner.

As the mirror deflects through an angle $\alpha$, the field of view of the detector deflects through an angle $\beta$, where $$\beta=2\alpha F$$

where $l$ = distance from center of mirror to detector $F$ = focal length of mirror For example, if the ratio of $F/l=8$, then the required swing of the mirror is 2° for an azimuth field of 30 arc-minutes. There are several methods for obtaining this mirror deflection. A piezoelectric drive system 17 is particularly attractive from the standpoint of simplicity and because it has no rubbing parts. It is possible to obtain mechanical deformation in some materials with the application of an electric potential. This principle may be used to obtain mirror rotation as illustrated in FIG. 5, showing the piezoelectric ceramic wafer stack 19. However, since the voltage required to obtain reasonable amounted of deflection is of the order of several thousands of volts, this may be excessively high for aircraft application.

Figure 6:
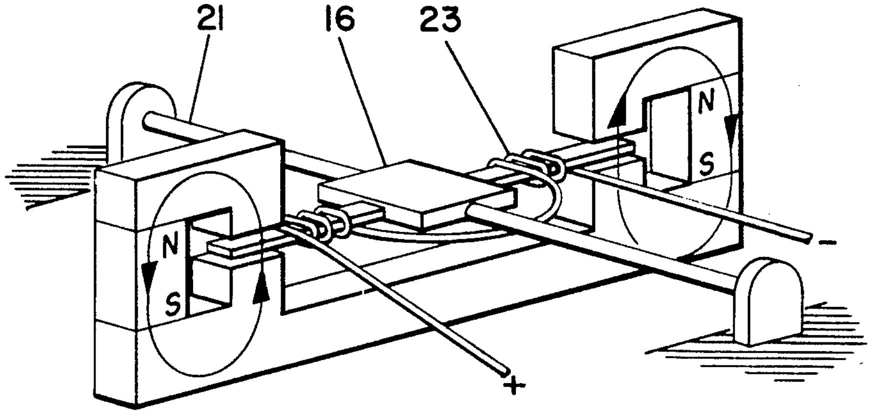
FIG. 6 is a perspective view of an electromagnetic driver.

The mirror motion may also be provided by a torsion bar 21 that is torsionally driven by electromagnetic torquer coils 23 FIG. 6. The primary advantage of this kind of scan system is that no rubbing parts, and hence no lubrication, is required. Because of the mechanism's inherent stiffness, the natural frequency of the device is high, thus reducing the effects of vibration. It is capable of being driven very slowly (0.2 c.p.s.). and very rapidly (100 c.p.s.). Because of its outstanding advantages, the electromagnetically driven mirror will provide both the coarse scan and fine track motion. (Another reflective surface on the back of the scanning mirror will provide the motion required for an optical pickoff.)

The requirements for the coarse field detector are:

1. Subtend instantaneous field of view: of 1.6 arc-minutes.
2. Provide high signal to noise ratio Because of the low frequency signal content in this mode (due to the relatively low scan rate) a cadmium selenide (CdSe) detector will be used. It has been shown that the low frequency signal to noise behavior of CdSe is superior to silicon (Si) and other solid-state photosensors.

Figure 7:
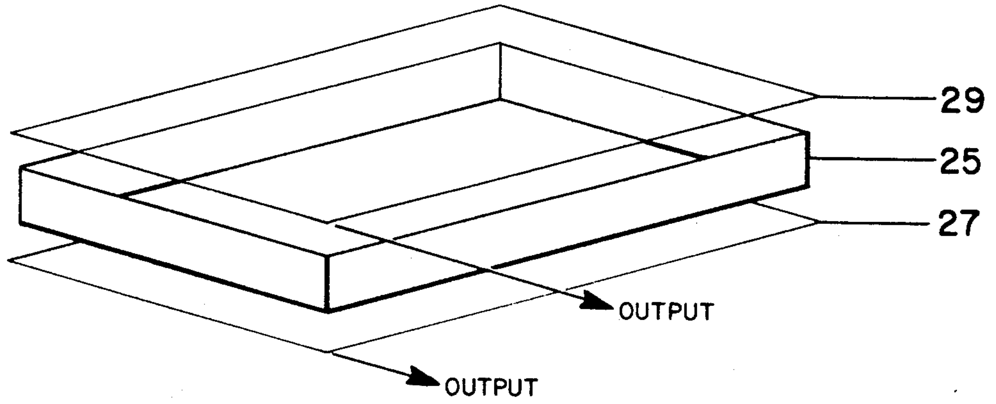
FIG. 7 illustrates one type of detector described herein.

There are several ways in which electrodes can be configured on CdSe in order to provide the coarse field. One such method is shown in FIG. 7.

A layer of CdSe is sandwiched between two layers of conducting electrodes 27 and 29, one of which is transparent. However, this configuration suffers from two disadvantages:

1. It is difficult to fabricate. Pinholes in the photoconductive material create low impedance paths between the two electrodes.
2. The wide detector creates a signal pulse whose time duration is long. The amplifier response must extend to DC, DC, thus increasing the $1/f$ noise contribution of the detector.

Figure 8:
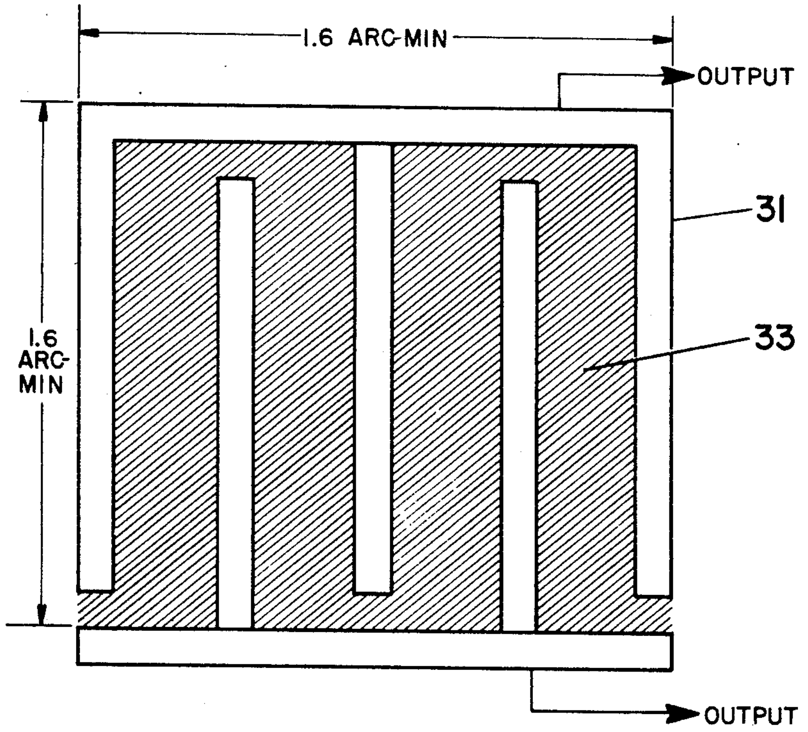
FIG. 8 shows another detector contemplated herein.

These problems are obviated by the electrode configuration shown in FIG. 8. Fingered-gold electrodes 31 separate the CdSe photoconductor material 33. This kind of detector effectively yields the wide field required and, at the same time, chops the signal. As a star passes over the slits, a series of pulses is generated as shown in FIG. 9. This figure compares the signals generated (and the frequency spectra) of:

1. A star detector whose slit width is approximately equal to the star diameter
2. A wide field sandwich detector
3. A wide field fingered detector.

Also superimposed on each of the curves is the power spectral density of the detector noise. The figure illustrates the fingered detector's ability to reduce the contribution of the $1/f$ current noise.

Since this detector effectively chops the star energy, it also acts as a partial filter to reduce the effects of sky background gradients. That is, the star, being a point source, is chopped by the detector fingers, thus producing a high frequency signal component. The background, however, is not a point target and is not chopped, thus producing low frequency components. The band-pass amplifier following the detector will reject these sky gradient low frequency signals.

To summarize, the advantages of the fingered detector are:

1 It provides wide field coverage

2. It decreases $1/f$ noise contributions of the detectors, thus yielding high signal-to-noise ratio 3. It reduces sky gradient effects.

The primary requirement for the fine-field (track) sensor are:

1 Full modulation of star-image energy at field "null," thus giving rise to a star-image "presence" signal.

2. Immunity to variations in system gain that arise due to amplifier and detector responsivity changes, and star-magnitude variations.

3. High signal to noise ratio at fast scan rates and at high backgrounds.

Provisions for both azimuth and elevation error signals, using unidirectional scan motion.

All these characteristics may be obtained by using silicon photovoltaic detectors with the proper (optimized) geometry for the fine mode (high frequency signal content).

It is desirable to chop the radiation at a frequency high enough so that low frequency noise does not degrade the signal to noise ratio appreciably. To accomplish this, scanning rates of at least 100 c.p.s. are required. The CdSe detectors used in the coarse mode are not fast enough to respond to this frequency.

To obtain the azimuth error, a single slit detector 35 is used (see FIG. 10). The detector effectively scans across the fine field of view (1.6 arc-minutes) by means of the mirror motion at a rate of 100 cps. FIG. 11 illustrates this scan motion.

At times 0, T/2, T, etc., the center of the detector is along the optical axis of the telescope. At T/4, 1¼ T, etc., it is at the extreme right-hand portion of the field, and at times 3/4T, 1¾T, etc., it is at the extreme left-hand portion of the field.

FIG. 12 illustrates the signal produced by the detector for:

1. A star on axis
2. A star to the right of the azimuthal optical axis
3. A star to the left of the azimuthal optical axis If we look at the Fourier spectrum of these signals, the following facts become apparent.

1. When the star is on target there is no 1/T component (100 c.p.s.) in the spectrum.

2. When the star is off target, the fundamental component of the signal is either in phase (star to the right) or out of phase (star to the left) with the reference drive motion.

3. The amplitude of this component (100 c.p.s.) is proportional to the displacement of the star.

Therefore, the 200 c.p.s. component may be used for the presence signal, and the 100 c.p.s. component for the azimuth error signal.

To obtain the highest signal to noise ratio and accuracy possible, the slit width will be made equal to half the desired field of view. (The signal component is proportional to slit width and reaches a maximum when the observation time $T$ is equal to ½ the period $T$.)

The fundamental component is equal to:

$$C_1=\frac{2E\sin\frac{\pi}{T}\frac{T}{2}}{\pi}$$

and is equal to: $C_1$ max=for $T=T/2$

The noise is proportional to the square root of the slit width since $I_n=(2e\,I_b\,\Delta f)^{1/2}$ and $I_b$ is proportional to the slit width.

In terms of accuracy, the value of telescope position uncertainty is reduced since the maximum signal to noise with the wide slit is achieved at ¼ of the total field of view rather than at ½, which would be obtained if a narrow slit was used. A further advantage of the wide detector is that the effects of vibration are reduced. Even through the star is moving in the optical plane, its energy is still collected by the wide detector and produces a usable signal.

The azimuth detector is used to generate a reference 100 c.p.s. sine wave. The elevation detectors 37 generate pulses which are symmetrical with the azimuth reference voltage only for a star with zero elevation error (see FIG. 13).

Thus, in order to obtain elevation error signals, it is only necessary to demodulate the fundamental component of the output signals, using the azimuth-generated voltage as a reference source.

The advantage of the detector shown in FIG. 13 is the simplicity of the electronics required to produce a elevation error signal.

From the foregoing, it is advantageous that

1. The coarse mode (where the acquisition problem is solved) is to be instrumented as a scanner, the fine mode (where high accuracy is achieved) is to be instrumented as a tracker.

2. Scan motion will be supplied by a mirror attached to an electromagnetically driven torsional member.

3. The coarse mode detector will be a wide field fingered CdSe that will supply star presence information and coarse position information; the fine field detector will be of Si that will produce both azimuth and elevation error signals with unidirectional drive.

A simplified block diagram of such a system is shown in FIG. 15. The system 14 beams the received energy on deflecting mirror 16 which in turn directs the energy onto detectors 15. The detector signal is amplified in amplifier 18 and passed to trigger circuit 20 which will start the second cycle of coarse position mode system 22. During the second cycle, the signal is applied to amplifiers 19 and passed to trigger 21 set at a higher threshold value than trigger circuit 20. Thereafter, the fine position mode system 24 takes over with detectors 35 and 37 which is essentially a modified V-slit type of arrangement. The instrument configuration is shown in FIGS. 15 and 18 and includes a 40 cm² effective *f*/4.5 aperture optical system 14 which receives the incoming energy and directs it at a deflecting mirror 16 with scanner electronics 17. The arrangement operates in coarse and fine detector systems 122 and 24. These detector system include amplifiers 18 and servo electronics 26. At the front of the optical system is a sun shutter 28 and there is also a focal adjustment 30. The entire arrangement is mounted on a platform gimbal 32.

There are ten identical detector chains 15. The motion of the star energy is accomplished by deflecting mirror 16 in the optical path of the incident energy so as to cross one of these ten chains 15. The coarse mode detector consists of four detector units 15*a* connected in parallel. When a star is moved across the detector, a series of pulses is generated. This series of pulses can be viewed as a modulated carrier whose frequency is equal to the time between pulses. A band-pass amplifier $A_1$ centered at the carrier frequency (with half bandwidth equal to $1/\sigma$ where $\sigma$ is the time it takes for the star to traverse the detector) amplifies the signal. The modulation of the star energy in this fashion enables the signal to be amplified with a narrow bandwidth and centered at a frequency out of the high $1/f$ noise range. The output of amplifier $A_1$ feeds a demodulator and filter $D_1$. The carrier frequency is removed and a $LD_1$ rectified signal is obtained which if fed to a level detector. When a predetermined threshold is exceeded, the output of the level detector activates a Schmitt trigger ($SH_1$) indicating the possibility of a star. The Schmitt trigger then activates a position servo PS which causes the scanner to reverse and rescan the area where the star indication occurred. If a star is present in this area, the integration time obtained will triple upon rescan. The resulting signal can now be applied wit a much narrower resulting signal can now be amplified with a much narrower band-pass amplifier $A_2$ still centered at the carrier frequency. Again, demodulation is performed in a second demodulator $D_2$, but the time constant required for this filter is increased by three. This results in an improvement in the signal to noise ratio of $\sqrt{3}$ at the rescanned points. The level detector $LD_2$ associated with this channel is set at a higher threshold. Another Schmitt trigger ($SH_2$) is activated by this level detector. When this trigger is activated, the probability of star presence is increased to 0.9985. The output of $SH_2$ activates flip-flop 2 which switches the scanner to the fine position mode system 24.

The system employs two modes of operation. When (FIG. 20) switch $S_1$ is closed, integrator $A_{11}$ generates a linear positive voltage which is amplified by the summing amplifier $A_{13}$. The initial state of FF2 is such that $S_3$ will feed the output of $A_{13}$ through OR gate OR1 and drive the servo SP. An output from $e_{01}$, indicating the possible presence of a star will switch FF1, opening $S_1$ and closing $S_2$. With $S_2$ closed, $A_{12}$ generates a linear negative-signalling signal which is directed to $A_{13}$. This reverses the direction of the mirror, thus rescanning the area where the star pulse occurred. The output $e_{01}$ also starts a delay generator which, after a predetermined time, resets FF1 changing the direction of the scan again. Thus, a pulse from $e_{01}$ increases the observation time of the area in question by a factor of three. If a star was in the rescanned area a pulse will occur at $e_{02}$. This pulse will flip FF2 which will open $S_3$ and $S_5$, and close $S_4$. This switches the scanner from the coarse to the fine detection mode. The mirror pickoff indicator is an analog device. Therefore, when $S_5$ is opened, the voltage at the time $e_{02}$ occurred will be maintained. The voltage is an indication of the azimuth position of the star. The elevation is determined by observing which of the 10 detector channels gave the indication of a star. The telescope is then indexed to center the star (within 1.6 arc-minutes) of the fine mode detectors.

In the fine mode, when the star is on axis in azimuth, a 200 c.p.s. square wave is generated. This signal is amplified by a high-impedance band-pass amplifier ($A_{22}$) centered about 200 c.p.s. and having a bandwidth of ±5 c.p.s. This signal acts as a presence signal and also as a reference signal. If the star is off axis in azimuth, the pulse spacing developed by the detector gives rise to a 100 c.p.s. fundamental which is gain amplified by a high-impedance band-pass amplifier ($A_{11}$) centered at 100 c.p.s. The output of this preamplifier is fed to phase-sensitive demodulator $D_{11}$, generating an error signal with polarity and amplitude proportional to azimuth error. (When the star is on axis, the 200 c.p.s. component is large; however, off axis, it decreases The 100 c.p.s. error signal which is large off axis and falls off as the star is centered is added to the 200 c.p.s. component to keep the presence signal approximately independent of star position.

When the star is centered in azimuth, the elevation error signal will be developed. The fundamental component is 200 c.p.s. with the amplitude proportional to the pulsewidth which, in turn, is proportional to the distance off axis. The signal is first amplified by $A_{22}$ and then demodulated by $D_{12}$, using the 200 cps azimuth presence signal as a reference. AVC is employed in both channels in order to make system performance independent of star magnitude.

It is to be observed therefore, that the present invention provides for a star detector and scanner wherein suspected star energy is first received by optical means 14. This suspected star energy is directed onto mirror 16 as a beam. Means are provided for deflecting this mean along a path in a first scanning mode across a plurality of detector elements 15 which are responsive to the beam and generate an output signal. This signal is received by first level detector means 20 acting only in response to signals past a certain level of intensity. This first level detector means actuates servo means causing the mirror to rescan a portion of the previously scanned path, in a second scanning mode. The signal received in the second scanning mode s supplied to second elevate detector means set a a different bandwidth and a higher threshold than in the first scanning mode. This second level detector means then actuates the electronics in a fine position mode 24 which will pinpoint the location of the now proven star energy. By using the system herein described, the system performance gain of this invention over the prior state of the art, which art is based on a nonvariable, optimum or linear matched filter, is achieved without a increase in the total time required to acquire a star with high probability.

What is claimed is:

1. In a star-scanning system, a linear array of detectors; first means to cause said array to scan along a path to sample a first field of view until a presumed star signal is detected; and, second means for rescanning only a small segment of said field where sad presumed signal is located, the signal to noise ratio during rescan being higher and matched filter band being different than during the scan so that any signal appearing during the rescan will almost undoubtedly be a star, whereby the system performance gain of this invention over the prior state of the art, which art is based on a nonvariable, optimum or linear matched filter is achieved without an increase in to total time required to acquire a star with high probability.

2. In a star detector wherein suspected star energy is received by optical mean a nd directed along a path across a plurality of detector elements, the improvement therein comprising in combination, first level detector means responsive to a certain level signal to which the output of said detector elements if fed; electronic and/or magnetic and/or servo means responsive to said first level detector jeans causing the rescan of a portion of the previously scanned path in a second scanning mode, and, second level detector means in said second scanning mode set at a higher threshold than in the first scanning mode with matched filter bandwidth corresponding to second scanning speed, whereby the system performance gain of this invention over the prior state of the art, which art is based on a nonvariable, optimum or linear matched filter is achieved without an increase in the total time required to acquire a star with high probability.

3. In a star detector as claimed in claim 2, said star energy being directed into a scanning mirror as a beam which is deflected along said path.

4. In a star detector as claimed in claim 3, said mirror scan in said second scanning mode being slower than in said first scanning mode.

5. In a star detector as claimed in claim 4, the scanning speed in the second scanning mode being of the order of one third the scanning speed in the first mode of scanning.

6. A star detector as claimed in claim 5 wherein the detector elements comprise at least three detector units in parallel so as to provide pulsating output, a band-pass amplifier responsive to said pulsating output a demodulator and filter receiving said amplified pulsating output and supplying a rectified filtered output, and, a Schmitt trigger including level setting means responsive to said rectified filtered output.

7. A star detector as claimed in claim 5 said second scanning mode enabling a fine mode including angularly disposed detector means said detector means providing information as to whether said star energy is on axis or off axis.